(12) United States Patent
Chen et al.

(10) Patent No.: US 9,140,924 B2
(45) Date of Patent: Sep. 22, 2015

(54) DISPLAY DEVICE AND MANUFACTURING METHOD THEREOF

(71) Applicant: Innolux Corporation, Miao-Li County (TW)

(72) Inventors: Chien-Hung Chen, Miao-Li County (TW); Chuan-Chung Wang, Miao-Li County (TW); Pi-Ying Chuang, Miao-Li County (TW); Li-Chieh Hsu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 170 days.

(21) Appl. No.: 13/832,193

(22) Filed: Mar. 15, 2013

(65) Prior Publication Data

US 2013/0278871 A1    Oct. 24, 2013

(30) Foreign Application Priority Data

Apr. 19, 2012    (TW) .............................. 101113931 A

(51) Int. Cl.
*G02F 1/1334*    (2006.01)
*G02F 1/1343*    (2006.01)
*G02F 1/137*    (2006.01)

(52) U.S. Cl.
CPC ........ *G02F 1/1334* (2013.01); *G02F 1/134363* (2013.01); *G02F 2001/13345* (2013.01); *G02F 2001/13793* (2013.01)

(58) Field of Classification Search
CPC ............ G02F 2001/13775; G02F 2001/13793; G02F 2001/13345
See application file for complete search history.

(56) References Cited

U.S. PATENT DOCUMENTS

| 5,473,450 | A | 12/1995 | Yamada et al. |
| 6,433,852 | B1 * | 8/2002 | Sonoda et al. ................ 349/156 |
| 8,854,586 | B2 | 10/2014 | Kubota et al. |
| 2011/0285929 | A1 * | 11/2011 | Kubota et al. .................. 349/43 |
| 2012/0162590 | A1 * | 6/2012 | Kim et al. ..................... 349/127 |

FOREIGN PATENT DOCUMENTS

CN    102326122 A    1/2012

OTHER PUBLICATIONS

TW Office Action dated Sep. 16, 2014.
Kikuchi, et al.: "Polymer-stabilized liquid crystal blue phases"; nature materials | vol. 1 | Sep. 2002 | www.nature.com/naturematerials; pp. 64-68.
CN Office Action dated May 4, 2015 in corresponding Chinese application (No. 201210117222.2).

* cited by examiner

Primary Examiner — Dennis Y Kim
(74) Attorney, Agent, or Firm — McClure, Qualey & Rodack, LLP

(57) ABSTRACT

A display device having a plurality of pixel units and a manufacturing method of the same are provided. The display device includes a first substrate assembly, a second substrate assembly, a liquid crystal mixture, and a pillared polymer network. The first substrate assembly includes a first substrate and a first electrode layer disposed on the first substrate. The second substrate assembly includes a second substrate. The liquid crystal mixture is disposed between the first and second substrate assemblies. The pillared polymer network is disposed between the first and second substrate assemblies and has a first end and second end. The first end abuts against the first substrate assembly and is disposed correspondingly to the first electrode layer. The second end abuts against the second substrate assembly. Each of the pixel units includes the pillared polymer network.

10 Claims, 10 Drawing Sheets

DISPLAY DEVICE AND MANUFACTURING METHOD THEREOF

This application claims the benefit of Taiwan application Serial No. 101113931, filed Apr. 19, 2012, the subject matter of which is incorporated herein by reference.

BACKGROUND OF THE INVENTION

1. Field of the Invention

The invention relates in general to a display device and a manufacturing method thereof, and more particularly to a display device including a pillared polymer network and a manufacturing method thereof.

2. Description of the Related Art

Blue phase liquid crystals are an advantageous optically isotropic liquid crystal material, which requires no alignment films and has a response time of within sub-milliseconds. However, blue phase liquid crystals suffer from a drawback of having an operating temperature range of only 1K. To overcome such drawback, a technique of polymer stabilized blue phase liquid crystals is developed by researchers. In the technique of polymer stabilized blue phase liquid crystals, the operating temperature range is increased from the original 1K to as high as 60K. Yet, the driving voltage and hysteresis of blue phase liquid crystals remain issues to be solved.

Therefore, there is a need for a solution that is capable of maintaining a large operating temperature range while also reducing the driving voltage and hysteresis for further enhancing display quality of blue phase liquid crystal display devices.

SUMMARY OF THE INVENTION

The invention is directed to a display device and a manufacturing method thereof. By configuring the position of a pillared polymer network, transmittance is effectively increased and hysteresis effects are mitigated, so as to reduce a driving voltage of the display device and enhance display quality of the display device.

According to an aspect the present invention, a display device having a plurality of pixel units is provided. The display device at least includes a first substrate assembly, a second substrate assembly, a liquid crystal mixture, and a pillared polymer network. The first substrate assembly includes a first substrate and a first electrode layer disposed on the first substrate. The second substrate assembly includes a second substrate. The liquid crystal mixture is disposed between the first and second substrate assemblies. The pillared polymer network is disposed between the first and second substrate assemblies, and has a first end and a second end. The first end abuts against the first substrate assembly and is disposed correspondingly to the first electrode layer. The second end abuts against the second substrate assembly. Each of the pixel units includes the pillared polymer network.

According to another aspect of the present invention, a manufacturing method of a display device is provided. The display device includes a plurality of pixel units. The manufacturing method includes steps of: providing a first substrate assembly, including providing a first substrate and forming a first electrode layer on the first substrate; providing a second substrate assembly including a second substrate; assembling the first and second substrate assemblies, wherein the first electrode layer is disposed between the first and second substrates; filling a liquid crystal mixture and an ultraviolet curing monomer into between the first and second substrate assemblies; and radiating the ultraviolet curing monomer by an ultraviolet light according to a patterned mask from one of the sides of the first and second substrate assemblies to form a pillared polymer network. The pillared polymer network has a first end and a second end. The first end abuts against the first substrate assembly and is disposed correspondingly to the first electrode layer. The second end abuts against the second substrate assembly. Each of the pixel units includes one pillared polymer network. Further, the liquid crystal mixture is optically isotropic when the ultraviolet curing monomer is radiated by the ultraviolet light.

According to the yet another aspect of the present invention, a manufacturing method of a display device is provided. The manufacturing method includes steps of: providing a first substrate assembly, including providing a first substrate and forming a patterned first electrode layer on the first substrate; providing a second substrate assembly including a second substrate; assembling the first and second substrate assemblies, wherein the patterned first electrode layer is disposed between the first and second substrates; filling a liquid crystal mixture and a thermal curing monomer into between the first and second substrate assemblies; and heating the thermal curing monomer by the patterned first electrode layer to form a pillared polymer network. The pillared polymer network has a first end and a second end. The first end abuts against the pattern first electrode layer. The second end abuts against the second substrate assembly. Each of the pixel units includes one pillared polymer network. Further, the liquid crystal mixture is optically isotropic when the thermal curing monomer is heated.

The above and other aspects of the invention will become better understood with regard to the following detailed description of the preferred but non-limiting embodiments. The following description is made with reference to the accompanying drawings.

DETAILED DESCRIPTION OF THE INVENTION

A display device and a manufacturing method thereof is provided by embodiments of the disclosure. Positions of two ends of a pillared polymer network in the display device respectively abut against a first substrate assembly and a second substrate assembly. Thus, transmittance is effectively increased and hysteresis effects are mitigated to reduce a driving voltage of the display device and enhance display quality of the display device. It should be noted that details of structures and manufacturing steps described in the embodiments are examples for explaining the present invention rather than limitations to the present invention. The structures and steps can be adjusted and modified by a person having ordinary skill in the art according to actual application requirements; as such modifications are also encompassed within the scope of the present invention.

Figure 1A:
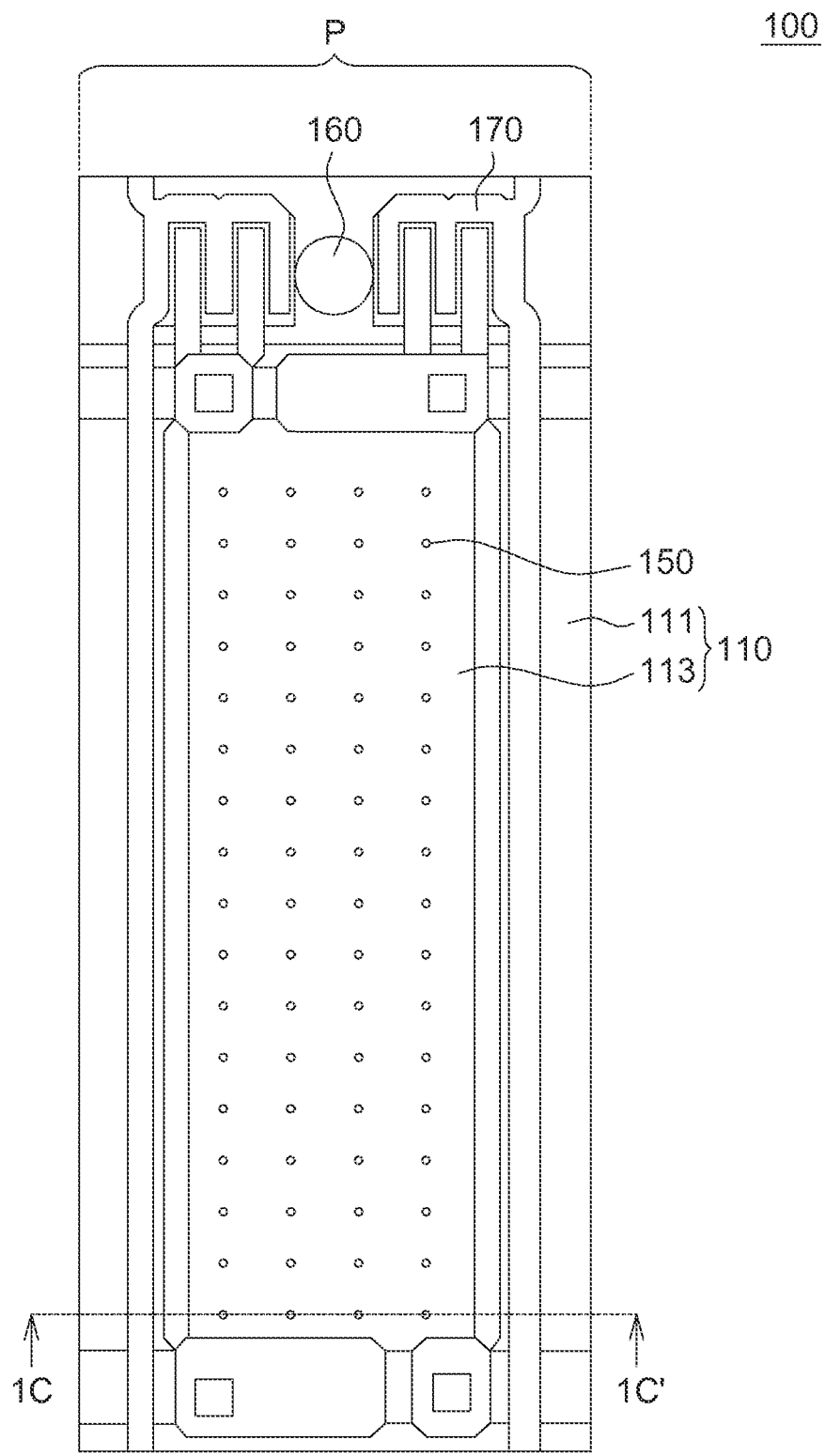
FIG. 1A is a schematic diagram of a display device according to a first embodiment of the present invention.
Figure 1B:
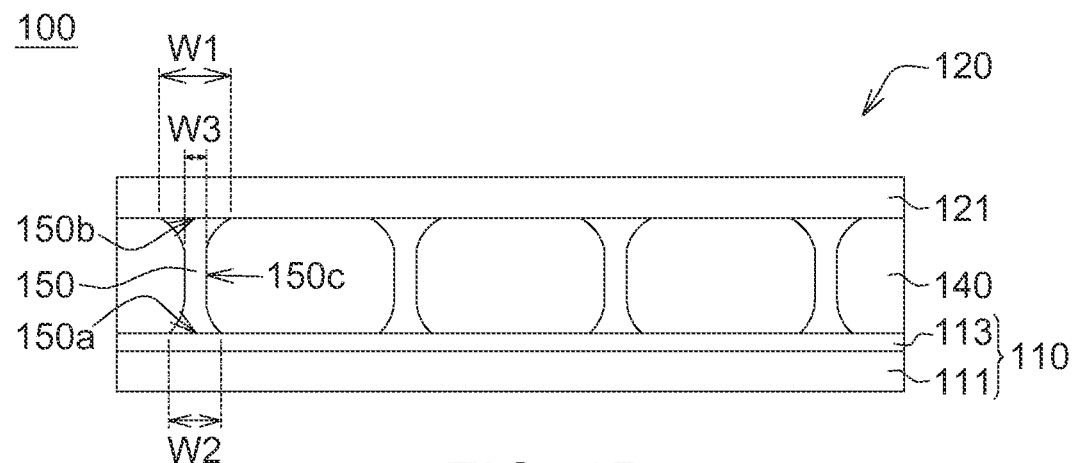
FIG. 1B is a sectional view along a section line 1C-1C' in FIG. 1A.

FIG. 1A shows a schematic diagram of a display device according to a first embodiment of the present invention; FIG. 1B shows a sectional view along a section line 1C-1C' in FIG. 1A. Referring to FIGS. 1A and 1B, a display device 100 has a plurality of pixel units P. In FIG. 1A, one of the pixel units P is depicted. The display device 100 includes a first substrate assembly 110, a second substrate assembly 120, a liquid crystal mixture 140, and a pillared polymer network 150. The first substrate assembly 110 includes a first substrate 111 and a first electrode layer 113 disposed on the first substrate 111. The second substrate assembly 120 includes a second substrate 121. The liquid crystal mixture 140 is disposed between the first substrate assembly 110 and the second substrate assembly 120. The pillared polymer network 150 is disposed between the first substrate assembly 110 and the second substrate assembly 120, and the pillared polymer network 150 has a first end 150a and a second end 150b. The first end 150a abuts against the first substrate assembly 110 and is disposed correspondingly to the first electrode layer 113. The second end 150b abuts against the second substrate assembly 120. The pixel unit P includes at least one pillared polymer network 150. In an embodiment, each of the pixel units P includes one pillared polymer network 150. In an embodiment, for example, the first end 150a abuts against the first electrode layer 113, and the second end 150b abuts against the second substrate 121. In an embodiment, for example, the first substrate 111 and the second substrate 121 are made of glass, and the first electrode layer 113 is made of a metal or a transparent conductive material, such as indium tin oxide (ITO). In practice, materials of the first substrate 111, the second substrate 121, and the first electrode layer 113 may be selected to adapt to actual application requirements, and are not limited to the described examples.

In an embodiment, as shown in FIG. 1A, the display device 100 further includes a photo spacer 160 and thin-film transistors 170 disposed on the first substrate assembly 110. In an embodiment, the photo spacer 160 is disposed neighboring to the thin-film transistors 170. For example, the photo spacer 160 is a square, a circle, or any other shapes, and has a width of 9 to 80 μm and a length of 9 to 80 μm. In an embodiment, as shown in FIG. 1A, one pixel unit P includes one photo spacer 160. In an alternative embodiment, every three or more pixel units P are correspondingly disposed with one photo spacer 160. Taking the width of one pixel unit P being approximately 70 to 200 μm for example, a distance between every two photo spacers 160 in the display device 100 is approximately above 500 μm, for example.

In an embodiment, the first substrate assembly 110 and the second substrate assembly 120 may further respectively include at least one functional film. For example, the first substrate assembly 110 further includes a dielectric layer (not shown) disposed on the first electrode layer 113, and the second substrate assembly 120 further includes a color filter (not shown) disposed on the second substrate 121, optionally.

In practice, the number and type of the functional film may be appropriately selected to adapt to actual application requirements, and are not limited to the described examples.

An irregularly distributed polymer network in the liquid crystal mixture can easily degrade the display quality. In an embodiment, the first end 150a of the pillared polymer network 150 abuts against the first substrate assembly 110 and is disposed correspondingly to the first electrode layer 113. The second end 150b of the pillared polymer network 150 abuts against the second substrate assembly 120. That is to say, the pillared polymer network 150 is regularly arranged between the first substrate assembly 110 and the second substrate assembly 120, such that overall transmittance of the display device can be increased to enhance the display quality. Further, the two ends of the pillared polymer network 150 respectively abut against the first substrate assembly 110 and the second substrate assembly 120 to adjust the pillared polymer network 150 to an ideal position, so as to effectively mitigate hysteresis effects to further reduce the driving voltage and enhance the display quality of the display device. In practice, the number and arrangement of the pillared polymer network 150 can be appropriately selected to adapt to actual application requirements, and are not limited to the described examples.

As shown in FIG. 1B, the pillared polymer network 150 is disposed at a position corresponding to a part of the second substrate 121 to occupy a part of the area on the second substrate 121. In an embodiment, in a pixel unit, a ratio of the part of area of the second substrate 121 correspondingly disposed with the pillared polymer network 150 to the area of the second substrate 121 is 1% to 99%. For example, in an embodiment, the ratio is 50%.

In an embodiment, for example, the pillared polymer network 150 is rectangular, circular, or strip-like in shape, and the pillars in the pillared polymer network 150 have a width of 500 nm to 5 μm and a length of 500 nm to 300 μm. The above-mentioned shapes are made from mask opening. In an embodiment, each pixel unit P is correspondingly disposed with at least two pillared polymer networks 150. Taking the width of one pixel unit P being about 70 to 200 μm for example, the distance between every two polymer pillars in the pillared polymer network 150 is 5 to 200 μm, for example.

Referring to FIG. 1B, the pillared polymer network 150 has a first end 150a, a second end 150b, and a middle section 150c. A width W1 of the first end 150a and a width W2 of the second end 150b of the pillared polymer network 150 are both greater than a width W3 of the middle section 150c. In an embodiment, the width W2 of the second end 150b may be greater than the width W1 of the first end 150a, with a ratio of the width W2 of the second end 150b to the width W1 of the first end 150a being 105% to greater than 100%, for example. In an embodiment, a polymer network (not shown) is further included in-between the pillared polymer network 150 for connecting the pillars in the pillared polymer network 150. The polymer network may be a plurality of polymer branch pillars or a network polymer network, and is not limited to the foregoing types.

In an embodiment, the pillared polymer network 150 is formed from at least one ultraviolet curing monomer. For example, the ultraviolet curing monomer is an acrylate-based compound, and the liquid crystal mixture 140 is a blue phase liquid crystal mixture. In practice, the types of the ultraviolet curing monomer and the liquid crystal mixture 140 may be appropriately selected to adapt to actual application requirements, and are not limited to the described examples.

In an embodiment, for example, the pillars in the pillared polymer network 150 are arranged in an array on the first substrate assembly 110, e.g., on the first electrode layer 113. In an embodiment, in the array formed by the pillared polymer network 150, the number of pillars in the pillared polymer network 150 of each column may be the same or different. When the number of the pillars in the pillared polymer network 150 of each column is different, at least one space without the pillars in the pillared polymer network 150 may be formed in the array formed by the pillared polymer network 150. Taking the pillars in the pillared polymer network 150 forming an array for example, the size and position of the space without the pillars in the pillared polymer network 150 may be controlled by adjusting the number of the pillars in the pillared polymer network 150 of each column.

Figure 1C:
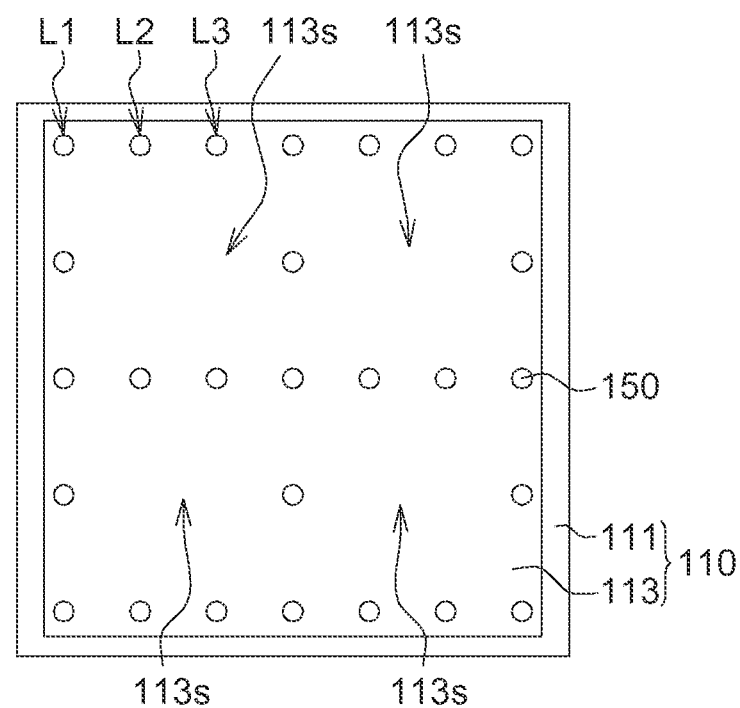
FIG. 1C is a partial top view of a first electrode layer and a pillared polymer network according to an embodiment of the present invention.

FIG. 1C shows a partial top view of a first electrode layer and a pillared polymer network according to an embodiment of the present invention. As shown in FIG. 1C, in an embodiment, for example, the first electrode layer 113 is a planar electrode layer disposed on the first substrate 111, and the pillared polymer network 150 is disposed on the first electrode layer 113 in an array arrangement. In every three columns of the pillars in the pillared polymer network 150, the numbers of the pillars in the pillared polymer network 150 in a column L2 and a column L3 are smaller than the number of the pillars in the pillared polymer network 150 in a column L1, thus forming a space 113s without the pillars in the pillared polymer network 150. The space 113s may accommodate the liquid crystal mixture 140 to increase the transmittance and mitigating the hysteresis effects, thereby reducing the driving voltage of the display device. Thus, by controlling and designing the number and position of the pillars in the pillared polymer network 150, the size and position of the space 113s can be modified to adjust the distribution of the liquid crystal mixture 140 in the pixel unit. Further, satisfactory transmittance and stability of the liquid crystal mixture 140 are also achieved at the same time to provide the display device with optimum optical characteristics.

Figure 2A:
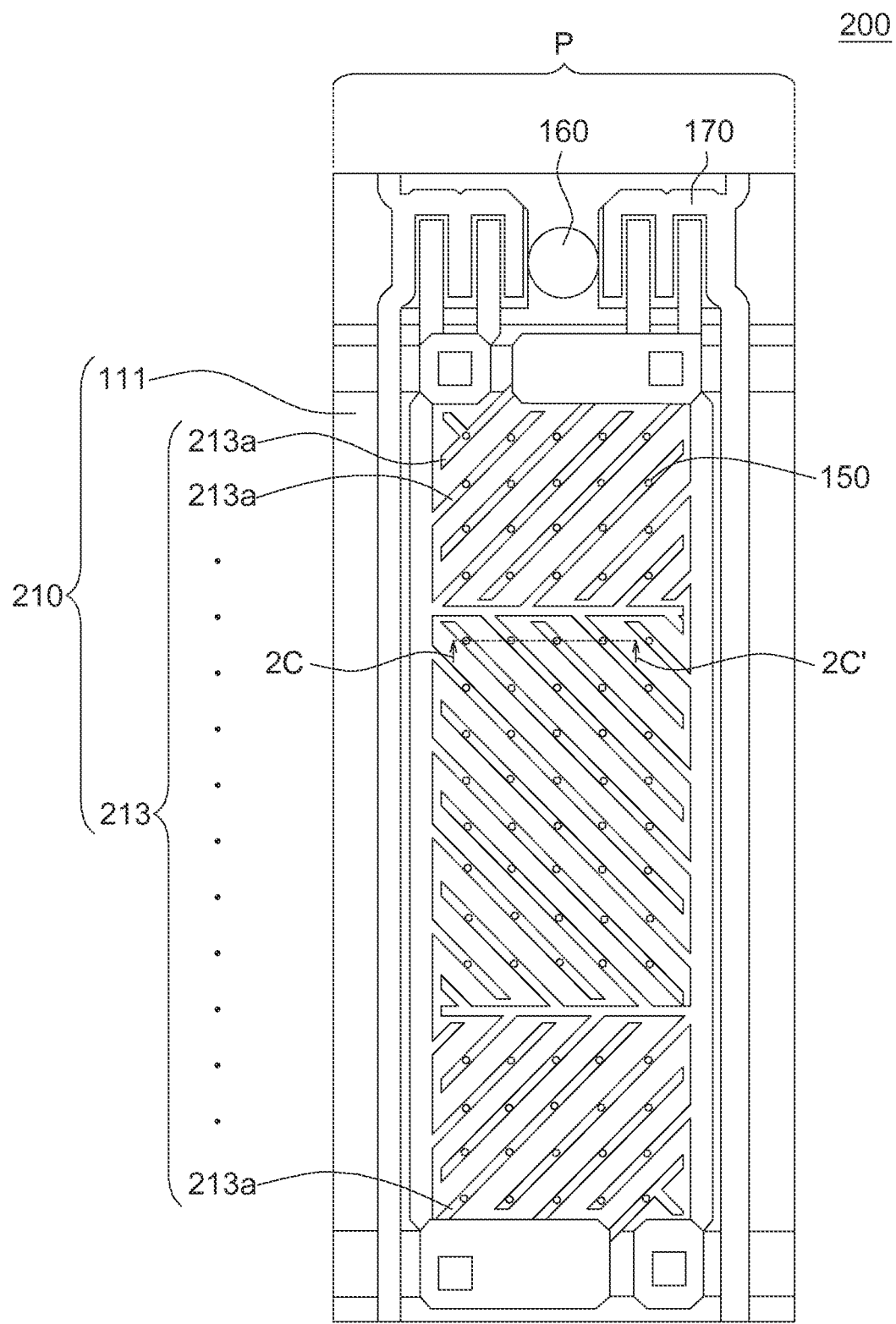
FIG. 2A is a schematic diagram of a display device according to a second embodiment of the present invention.
Figure 2B:
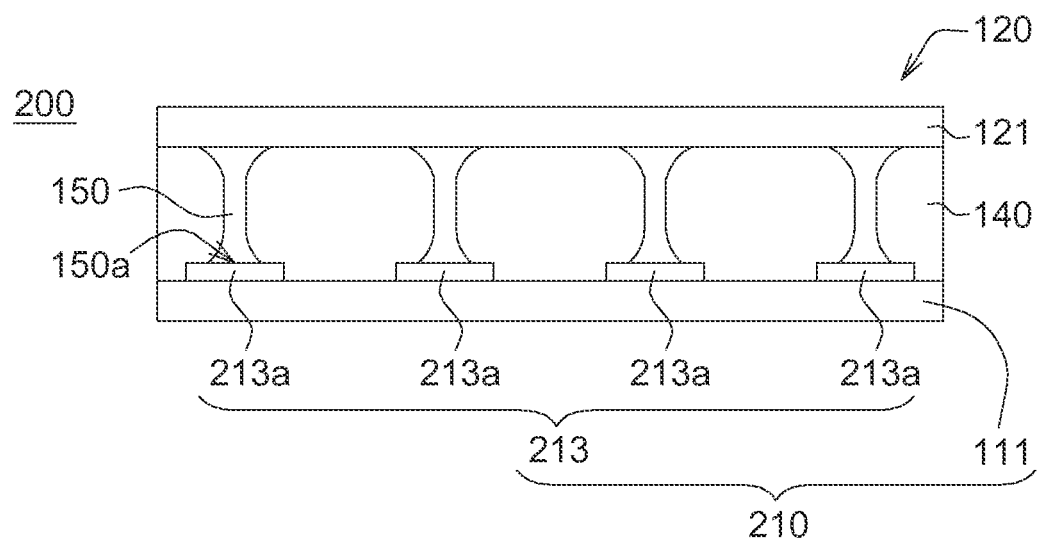
FIG. 2B is a sectional view along a section line 2C-2C' in FIG. 2A.

FIG. 2A shows a schematic diagram of a display device according to a second embodiment of the present invention; FIG. 2B shows a sectional view along a section line 2C-2C' in FIG. 2A. A display device 200 includes a plurality of pixel units P. In FIG. 2A, one of the pixel units P is depicted. Same elements in this embodiment and the foregoing embodiment inherit the same denotations. Details of the same elements can be referred in the foregoing descriptions, and shall be omitted herein.

The display device 200 includes a first substrate assembly 210, a second substrate assembly 120, a liquid crystal mixture 140, and a pillared polymer network 150. The first substrate assembly 210 includes a first substrate 111 and a first electrode layer 213 disposed on the first substrate 111. The first electrode layer 213 includes a plurality of first electrode strips 213a, and first end 150a of the pillared polymer network 150 is disposed correspondingly to the first electrode strips 213a. In an embodiment, for example, the first end 150a of the pillared polymer network 150 abuts against the first electrode strips 213a. The pixel unit P includes at least one pillared polymer network 150. In an embodiment, each of the pixel units P includes one pillared polymer network 150.

In an embodiment, the display device 200 may further include a photo spacer 160 and thin-film transistors 170 disposed on the first substrate assembly 110. In an embodiment, the photo spacer 160 is disposed neighboring to the thin-film transistors 170.

In an embodiment, the first electrode strips 213a are spaced apart from one another and do not completely cover the first substrate 111. When the first electrode strip 213a is located at a dark region, the first end 150a of the pillared polymer network 150 is disposed correspondingly to the first electrode layer 213 in a way that a light-transmitting region is not shielded. Thus, the hysteresis effects can be mitigated by adjusting the number and arrangement of the pillared polymer network 150 to further reduce the driving voltage of the display device while also maintaining satisfactory transmittance of the display device.

Figure 2C:
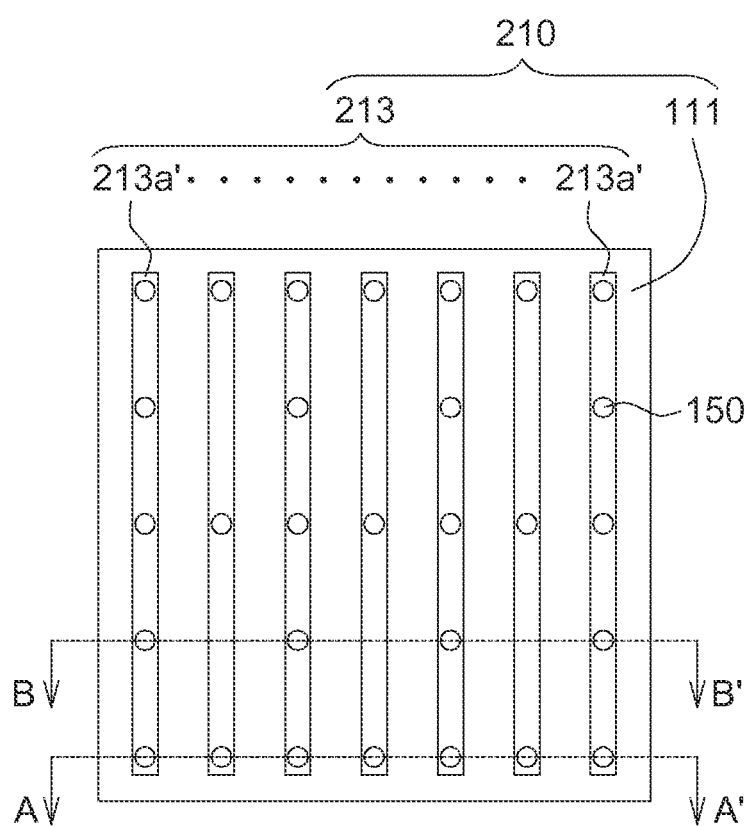
FIGS. 2C and 2D are partial top views of a first electrode layer and a pillared polymer network according to a second embodiment of the present invention.
Figure 2D:
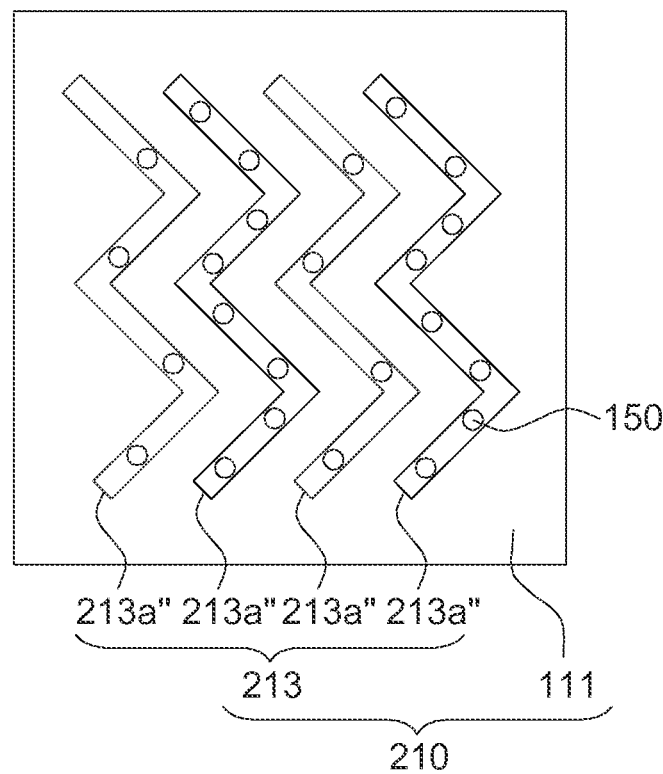

FIGS. 2C and 2D shows top views of a first electrode layer and pillared polymer network according to the second embodiment of the present invention. Referring to FIGS. 2C and 2D, in an embodiment, on a section plane along a direction perpendicular to an extension direction of first electrode strips 213a', a ratio of the number of the pillars in the pillared polymer network 150 to the number of the first electrode strips 213a' is 0.1 to 10. As shown FIG. 2C, in an embodiment, taking the first electrode strips 213a' as straight strip-like electrodes for example, on a section plane along a section line A-A', the ratio of the number of pillars in the pillared polymer network 150 to the number of the first electrode strips 213a' is 1; on a section plane along a section line B-B', the ratio of the number of pillars in the pillared polymer network 150 to the number of the first electrode strips 213a' is 0.5. By modifying the ratio of the number of pillars in the pillared polymer network 150 to the number of the first electrode strips 213a' on different section planes, the size and position of the spaces without the pillars in the pillared polymer network can be controlled and adjusted. In an embodiment, for example, as shown in FIG. 2C, the first electrode strips 213a' are straight strip-like electrodes; as shown in FIG. 2D, the first electrode strips 213a' are zigzag electrodes. In an embodiment, for example, a width of the first electrode strips is 3 to 5 μm, a distance between two adjacent first electrode strips is 3 to 5 μm, and a distance between two adjacent pillars in the pillared polymer network 150 on the same first electrode strip is greater than or equal to 10 μm. In practice, the shape, size, and number of the pillars in the pillared polymer network 150 and the distance between two adjacent pillars in the pillared polymer network 150 can be appropriate selected to adapt to actual application requirements, and are not limited to the described examples.

Figure 3:
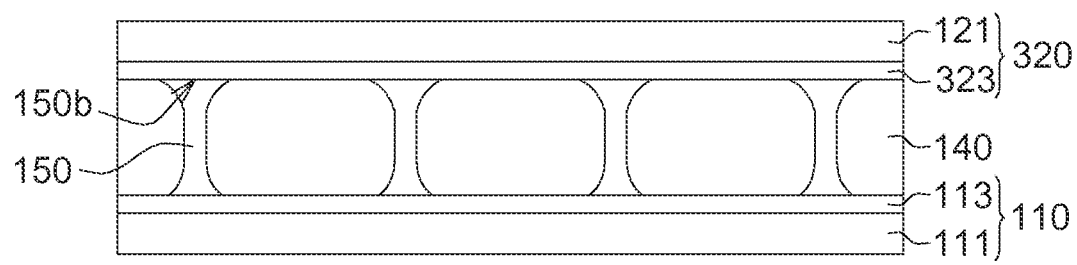
FIG. 3 is a schematic diagram of a display device according to a third embodiment of the present invention.

FIG. 3 shows a sectional view of a display device according to a third embodiment of the present invention. Same elements in this embodiment and the foregoing embodiment inherit the same denotations. Details of the same elements can be referred in the foregoing descriptions, and shall be omitted herein.

A display device 300 includes a first substrate assembly 110, a second substrate assembly 320, a liquid crystal mixture 140, and a pillared polymer network 150. The first substrate assembly 110 includes a first substrate 111 and a first electrode layer 113 disposed on the first substrate 111. The second substrate assembly 320 includes a second substrate 121 and a second electrode layer 323 disposed on the second substrate 121. The first end 150a of the pillared polymer network 150 abuts against the first substrate assembly 110. The second end 150b of the pillared polymer network 150 abuts against the second substrate assembly 120 and is disposed correspondingly to the second electrode layer 323.

As shown in FIG. 3, in an embodiment, for example, the first electrode layer 113 is a planar electrode layer disposed on the first substrate 111, and the second electrode layer 323 is a planar electrode layer disposed on the second substrate 121. In an embodiment, the first end 150a of the pillared polymer network 150 abuts against the first electrode layer 113, and the second end 150b of the pillared polymer network 150 abuts against the second electrode layer 323. Similarly, by modifying a density and relative positions of the pillars in the pillared polymer network 150 corresponding to the first electrode layer 113, the size and position of the spaces without the pillars in the pillared polymer network 150 can be controlled and adjusted to adjust the distribution of the liquid crystal mixture 140 in the pixel unit, thereby obtaining optimum optical characteristics.

Figure 4:
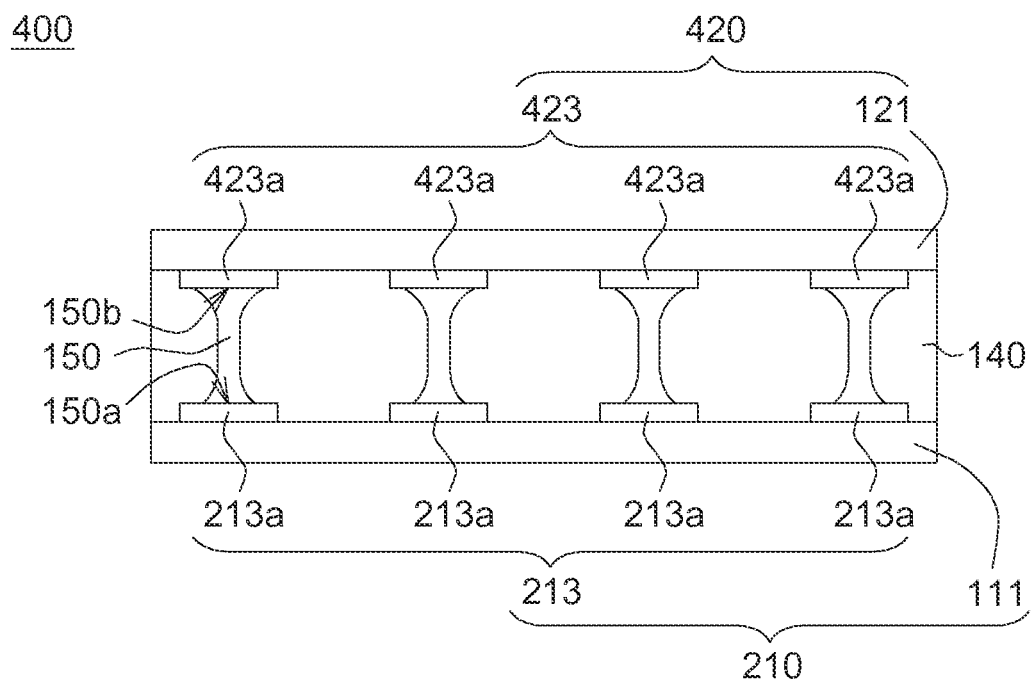
FIG. 4 is a schematic diagram of a display device according to a fourth embodiment of the present invention.

FIG. 4 shows a sectional view of a display device according to a fourth embodiment of the present invention. Same elements in this embodiment and the foregoing embodiment inherit the same denotations. Details of the same elements can be referred in the foregoing descriptions, and shall be omitted herein.

A display device 400 includes a first substrate assembly 210, a second substrate assembly 420, a liquid crystal mixture 140, and a pillared polymer network 150. The first substrate assembly 210 includes a first substrate 111 and a first electrode layer 213 disposed on the first substrate 111. The first electrode layer 213 includes a plurality of first electrode strips 213a. First ends 150a of the polymer pillar 150 are disposed correspondingly to the first electrode strips 213a. The second substrate assembly 420 includes a second substrate 121 and a second electrode layer 423 disposed on the second substrate 121. The second electrode layer 423 includes a plurality of second electrode strips 423a. The second end 150b of the pillared polymer network 150 is disposed correspondingly to the second electrode strips 423a. In an embodiment, as shown in FIG. 4, the first end 150a of the pillared polymer network 150 abuts against the first electrode strips 213a, and the second end 150b of the pillared polymer network 150 abuts against the second electrode strips 423a.

In an embodiment, for example, the second electrode strips 423a are straight strip-like electrodes or zigzag electrodes. On a section plane along a direction perpendicular to an extension direction of the second electrode strips 423a, a ratio of the number of the pillars in the pillared polymer network 150 to the number of the second electrode strips 423a is 0.1 to 10. In practice, the shape and number of the second electrode strips 423a, and the ratio of the number of the second electrode strips 423a to the number of the pillars in the pillared polymer network 150 can be appropriately selected to adapt to actual application requirements, and are not limited to the described examples.

Figure 5:
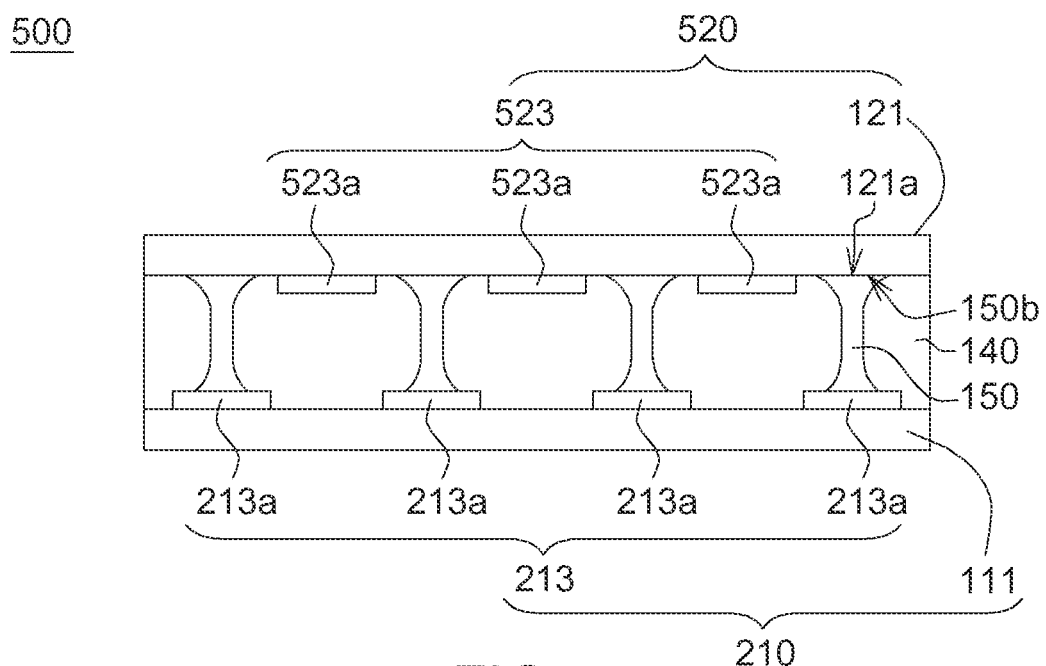
FIG. 5 is a schematic diagram of a display device according to a fifth embodiment of the present invention.

FIG. 5 shows a sectional view of a display device according to a fifth embodiment of the present invention. Same elements in this embodiment and the foregoing embodiment inherit the same denotations. Details of the same elements can be referred in the foregoing descriptions, and shall be omitted herein.

A display device 500 includes a first substrate assembly 210, a second substrate assembly 520, a liquid crystal mixture 140, and a pillared polymer network 150. The first substrate assembly 210 includes a first substrate 111 and a first electrode layer 213 disposed on the first substrate 111. The first electrode layer 213 includes a plurality of first electrode strips 213a. The first ends 150a of the pillared polymer network 150 are disposed correspondingly to the first electrode strips 213a. The second substrate assembly 520 includes a second substrate 121 and a second electrode layer 523 disposed on the second substrate 121. The second electrode layer 523 includes a plurality of second electrode strips 523a, which are spaced by a distance from one another to expose a partial surface 121a of the second substrate 121. The second end 150b of the pillared polymer network 150 is disposed correspondingly to the exposed partial surface 121a of the second substrate assembly 120. In an embodiment, as shown in FIG. 5, the first end 150a of the pillared polymer network 150 abuts against the first electrode strips 213a, and the second end 150b of the pillared polymer network 150 abuts against the exposed partial surface 121a of the second substrate 121.

Figure 6:
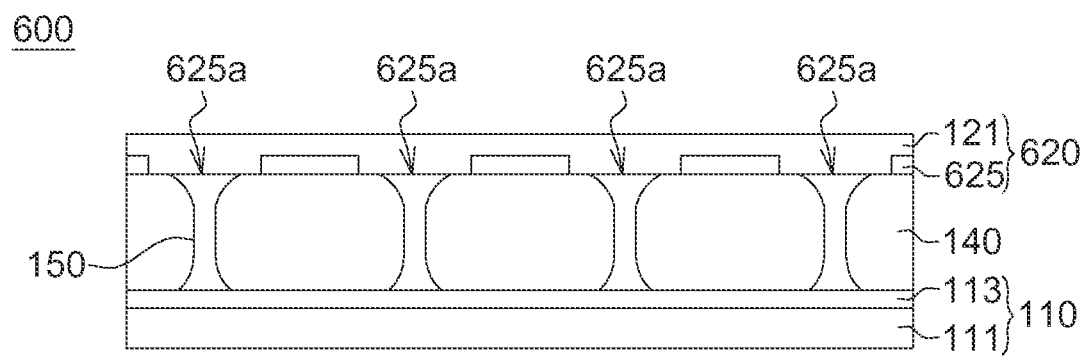
FIG. 6 is a schematic diagram of a display device according to a sixth embodiment of the present invention.

FIG. 6 shows a sectional view of a display device according to a sixth embodiment of the present invention. Same elements in this embodiment and the foregoing embodiment inherit the same denotations. Details of the same elements can be referred in the foregoing descriptions, and shall be omitted herein.

A display device 600 includes a first substrate assembly 110, a second substrate assembly 620, a liquid crystal mixture 140, and a pillared polymer network 150. The second substrate assembly 620 includes a second substrate 121 and a patterned mask 625 formed on the second substrate 121. The patterned mask 625 has a plurality of light-transmitting holes 625a, and positions of the light-transmitting holes 625 correspond to the position of the pillared polymer network 150.

In an embodiment, the patterned mask 625 is disposed in the second substrate assembly 620, and so a step of removing the mask can be omitted in subsequent processes to simplify an overall manufacturing process.

A manufacturing method of a display device according to an embodiment of the present invention is described below. It should be noted that details of the described steps are exemplary illustrations for explaining the present invention rather than limitations to the present invention. Adjustments and modifications may be made to the described steps according to actual application requirements by a person having ordinary skill in the art. Details of the manufacturing method are described with reference to FIGS. 7A to 7E, and 8A to 8C.

FIGS. 7A to 7E show schematic diagrams of a manufacturing method according to an embodiment of the present invention.

Figure 7A:
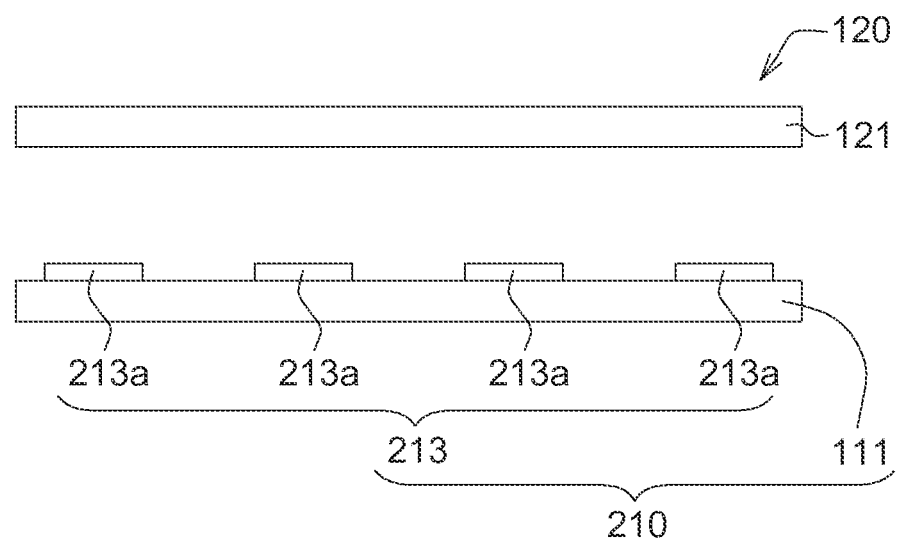
FIGS. 7A to 7E are schematic diagrams of a manufacturing method of a display device according to an embodiment of the present invention.

Referring to FIG. 7A, a first substrate assembly 210 is provided, and a second substrate assembly 120 is provided. In an embodiment, the step of providing the first substrate assembly 210 includes providing a first substrate 111 and forming a first electrode layer 213 on the first substrate 111; and the second substrate assembly 120 includes a second substrate 121. In an embodiment, the step of forming the first electrode layer 213 on the first substrate 111 further includes forming a plurality of first electrode strips 213a. In an embodiment, for example, the first substrate 111 and the second substrate 121 are made of glass. In practice, the materials and elements of the first substrate 111 and the second substrate 121 can be appropriately selected to adapt to actual application requirements, and are not limited to the described examples.

In an embodiment, a second electrode layer may be selectively formed on the second substrate 121 (referring to FIGS. 3 to 5). In an embodiment, the step of providing the second substrate assembly 120 may selectively include providing the second substrate 121 and forming a patterned mask on the second substrate 121 (referring to FIG. 6). The step of forming the patterned mask on the second substrate 121 may further include forming a plurality of light-transmitting holes on the patterned mask. By forming the patterned mask on the second substrate 121 of the second substrate assembly 120, a step of removing the mask can be omitted in subsequent processes to simplify an overall manufacturing process. In practice, the materials and elements of the second substrate 121 may be appropriately selected to adapt to actual application requirements, and are not limited to the described examples.

Figure 7B:
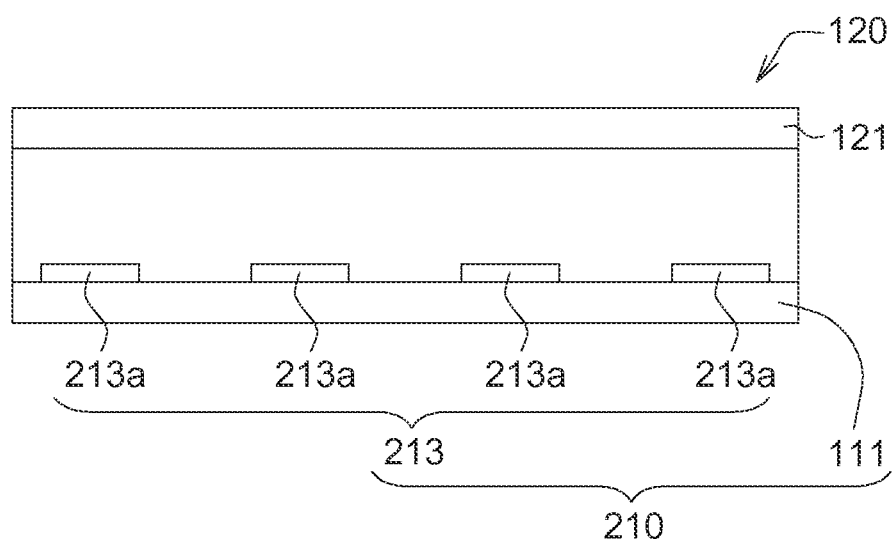

Referring to FIG. 7B, the first substrate assembly 210 is correspondingly assembled to the second substrate assembly 120. The first electrode layer 213 is located between the first substrate 111 and the second substrate 121. In an embodiment, the first electrode layer 213 including a plurality of first electrode strips 213a is taken as an example. In practice, the first electrode layer may also be a complete planar electrode (such as the first electrode layer 113 in FIG. 1C).

Figure 7C:
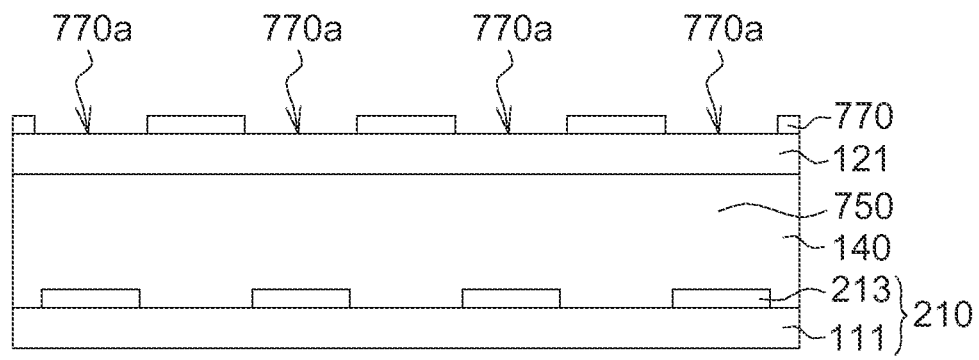

Referring to FIG. 7C, a liquid crystal mixture 140 and an ultraviolet curing monomer 750 are filled into between the first substrate assembly 210 and the second substrate assembly 120. In an embodiment, the liquid crystal mixture 140 and the ultraviolet curing monomer 750 are pre-mixed before being filled into between the first substrate assembly 210 and the second substrate assembly 120. In an embodiment, for example, the ultraviolet curing monomer 750 is an acrylate-based compound, and the liquid crystal mixture 140 is a blue phase liquid crystal mixture. In practice, the types of the ultraviolet curing monomer 750 and the liquid crystal mixture 140 may be appropriately selected according to actual application requirements, and are not limited to the described examples.

Referring to FIG. 7C, in an embodiment, a patterned mask 770 is selectively provided on the second substrate assembly 120. The step of providing the patterned mask 770 may further include forming a plurality of light-transmitting holes 770a on the patterned mask 770.

Figure 7D:
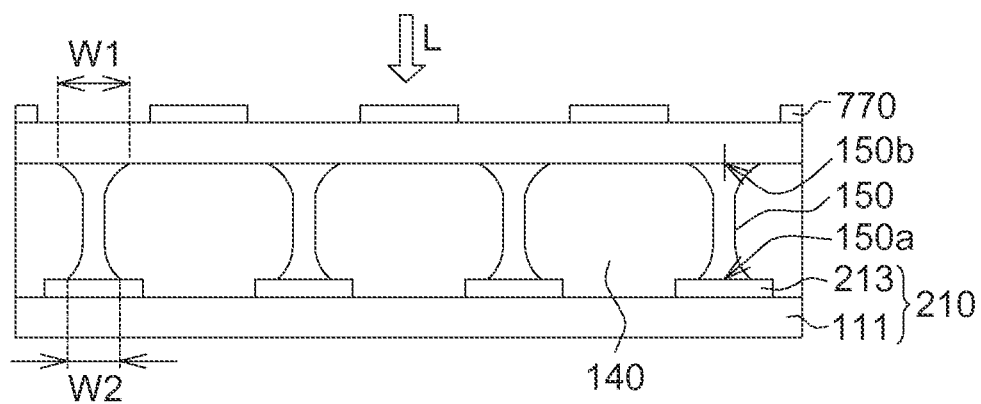

Referring to FIG. 7D, at one of the sides of the first substrate assembly 210 and the second substrate assembly 120, the ultraviolet curing monomer 750 is radiated by an ultraviolet light L according to the patterned mask 770 to form a pillared polymer network 150. As shown in FIG. 7D, the pillared polymer network 150 has a first end 150a and a second end 150b. The first end 150a abuts against the first substrate assembly 210 and is disposed correspondingly to the first electrode layer 213. The second end 150b abuts against the second substrate assembly 120. In an embodiment, for example, the first end 150a abuts against the first electrode layer 213, and the second end 150b abuts against the second substrate 121. In an embodiment, the ultraviolet light L enters the first substrate assembly 210 from the second substrate assembly 120, the second end 150b of the pillared polymer network 150 is located neighboring to an exposed plane (the second substrate assembly 120), and a width W2 of the second end 150b is greater than a width W1 of the first end 150a. The liquid crystal mixture 140 is optically isotropic when the ultraviolet curing monomer 750 is radiated by the ultraviolet light L. In an embodiment, taking the liquid crystal mixture 140 as a blue phase liquid crystal mixture for example, before radiating the ultraviolet curing monomer 750 by the ultraviolet light L, the mixture formed of the liquid crystal mixture 140 and the ultraviolet curing monomer 750 is first heated to reach a temperature at which the blue phase liquid crystal mixture are optically isotropic, e.g., at approximately 40° C. Next, the entire mixture is radiated by the ultraviolet light L, so as to cure the overall structure at the same time when forming the pillared polymer network 150. The temperature is then reduced to a room temperature after having formed the pillared polymer network 150.

In an embodiment, positions of the light-transmitting holes 770a of the patterned mask 770 correspond to the position of the pillared polymer network 150. In an alternative embodiment, when forming the patterned mask 770 on the second substrate 121 of the second substrate assembly 120, the positions of the light-transmitting holes of the patterned mask of the second substrate assembly 120 correspond to the position of the pillared polymer network 150. By shielding the ultraviolet light L with the patterned mask, only the ultraviolet curing monomer 750 at the selected light-transmitting holes is radiated, so that the pillared polymer network 150 is formed at only the selected position. Thus, the position, area, and density of the pillars in the pillared polymer network 150 disposed on the first electrode layer can be controlled to provide the display device with optimum optical characteristics.

In an embodiment, when disposing the second electrode layer on the second substrate 121, the second end 150b of the pillared polymer network 150 is disposed correspondingly to the second electrode layer. In an embodiment, for example, the second end 150b of the pillared polymer network 150 abuts against the second electrode layer.

Figure 7E:
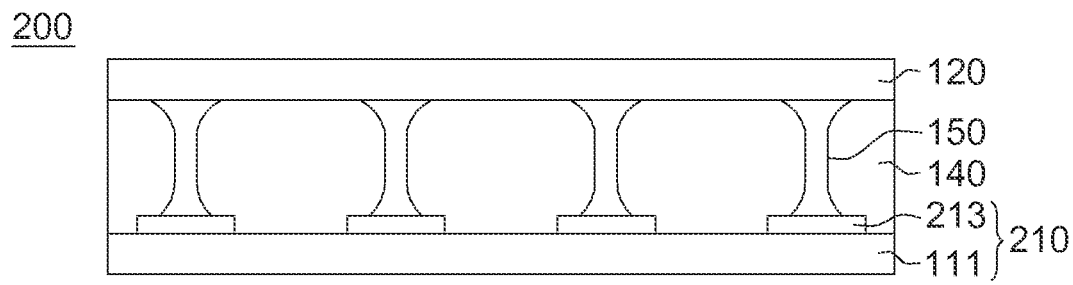

Referring to FIG. 7E, the patterned mask 770 is removed, as display device 200 is then formed. The display device 200 includes a plurality of pixel units, each including at least one pillared polymer network 150 (referring to FIG. 2A).

Figure 8A:
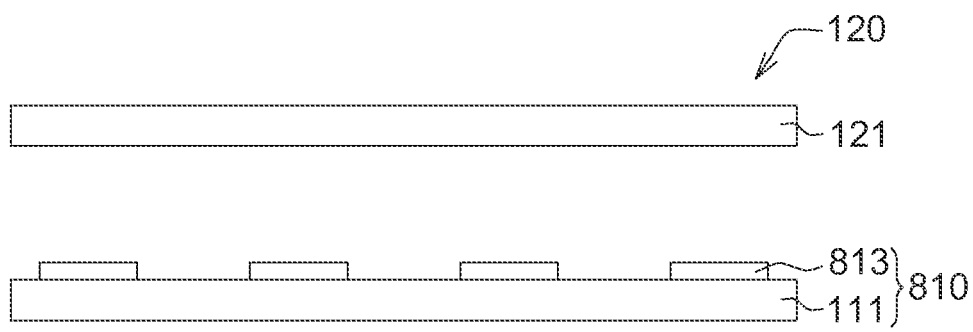
FIGS. 8A to 8C are schematic diagrams of a manufacturing method of a display device according to another embodiment of the present invention.
Figure 8B:
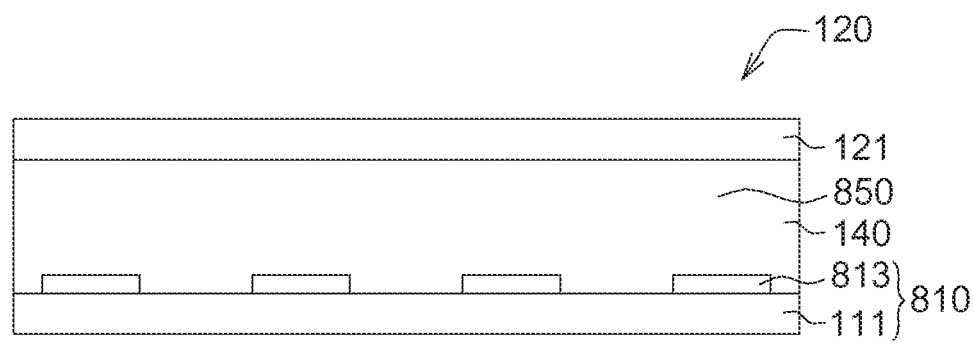
Figure 8C:
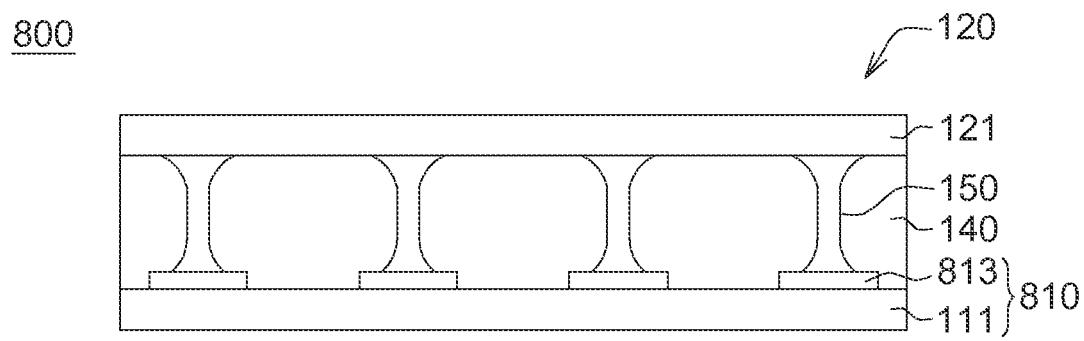

FIGS. 8A to 8C show schematic diagram of a manufacturing method according to another embodiment of the present invention.

Referring to FIG. 8A, a first substrate assembly 810 is provided, and a second substrate assembly 120 is provided. In an embodiment, the step of providing the first substrate assembly 810 includes providing a first substrate 111 and forming a patterned first electrode layer 813 on the first substrate 111; the second substrate assembly 120 includes a second substrate 121. In an embodiment, for example, the first substrate 111 and the second substrate 121 are made of glass. In an embodiment, a second electrode layer (not shown) is selectively formed on the second substrate 121. In practice, the materials and elements of the first substrate 111 and the second substrate 121 can be appropriately selected to adapt to actual application requirements, and are not limited to the described examples.

Referring to FIG. 8B, the first substrate assembly 810 is correspondingly assembled to the second substrate assembly 120. The patterned first electrode layer 813 is located between the first substrate 111 and the second substrate 121. In an embodiment, the position, size, and area of the patterned first electrode layer 813 correspond to the position, size, and area of pillars in the pillared polymer network to be subsequently formed. For example, the patterned first electrode layer 813 is made of a metal material or ITO and has a heat conduction efficiency higher than the heat conduction efficiency of the first substrate 111. In practice, the materials of the patterned first electrode layer 813 may also be appropriately selected according to actual application requirements, and is not limited to the described examples.

Referring to FIG. 8C, a liquid crystal mixture 140 and a thermal curing monomer 850 are filled into between the first substrate assembly 810 and the second substrate assembly 120, and the thermal curing monomer 850 is heated by the patterned first electrode layer 813 to form a pillared polymer network 150. In an embodiment, the pillared polymer network 150 is formed on the patterned first electrode layer 813. The pillared polymer network 150 has a first end 150a and a second end 150b. The first end 150a abuts against the patterned first electrode layer 813, and the second end 150b abuts against the second substrate assembly 120. The liquid crystal mixture 140 is optically isotropic when heating the thermal curing monomer 850. A display device 800 is then formed. The display device 800 includes a plurality of pixel units, each including at least one pillared polymer network 150.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, having a plurality of pixel units, comprising:
   a first substrate assembly, comprising a first substrate and a first electrode layer disposed on the first substrate;
   a second substrate assembly, comprising a second substrate;
   a liquid crystal mixture, disposed between the first substrate assembly and the second substrate assembly; and
   a pillared polymer network, disposed between the first substrate assembly and the second substrate assembly, having a first end and a second end; wherein, the first end abuts against the first substrate assembly and is disposed correspondingly to the first electrode layer, and the second end abuts against the second substrate assembly;
   wherein, each of the pixel units comprises the pillared polymer network; the first electrode layer comprises a plurality of first electrode strips; the pillared polymer network has a plurality of pillars, and the pillars are discontinuously disposed along an extension direction of the first electrode strips and overlap the first electrode strips.

2. The display device according to claim 1, wherein in each of the pixel units, a ratio of a partial area of the second substrate disposed with the pillared polymer network to an area of the second substrate is 1% to 99%.

3. The display device according to claim 1, wherein on a section plane along a direction perpendicular to the extension direction of the first electrode strips, a ratio of a number of the pillars in the pillared polymer network to a number of the first electrode strips is 0.1 to 10.

4. The display device according to claim 1, wherein the second substrate assembly further comprises a second electrode layer disposed on the second substrate, the second electrode layer comprises a plurality of second electrode strips, and the second end is disposed correspondingly to the second electrode strips.

5. The display device according to claim 1, wherein the second substrate assembly further comprises a second electrode layer disposed on the second substrate, the second electrode layer comprises a plurality of second electrode strips spaced apart from one another to expose a partial area of the second substrate, and the second end is disposed correspondingly to the partial area.

6. The display device according to claim 1, wherein a width of the first end and a width of the second end are greater than a width of a middle part of the pillared polymer network.

7. The display device according to claim 1, wherein a width of the second end is greater than a width of the first end.

8. The display device according to claim 7, wherein a ratio of the width of the second end to the width of the first end is 105% to greater than 100%.

9. The display device according to claim 1, wherein the pillared polymer network is formed from at least one ultraviolet curing monomer.

10. The display device according to claim 1, wherein the second substrate assembly further comprises a patterned mask formed on the second substrate, the patterned mask comprises a plurality of light-transmitting holes, and positions of the light-transmitting holes correspond to a position of the pillared polymer network.

* * * * *